United States Patent
Pomaranski et al.

(10) Patent No.: US 7,415,700 B2
(45) Date of Patent: Aug. 19, 2008

(54) RUNTIME QUALITY VERIFICATION OF EXECUTION UNITS

(75) Inventors: Ken Gary Pomaranski, Roseville, CA (US); Andrew Harvey Barr, Roseville, CA (US); Dale John Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 10/684,842

(22) Filed: Oct. 14, 2003

(65) Prior Publication Data

US 2005/0081191 A1 Apr. 14, 2005

(51) Int. Cl.
*G06F 9/44* (2006.01)

(52) U.S. Cl. .................. 717/127; 717/124; 717/125; 717/126; 717/159; 717/160; 717/161; 714/25; 714/26; 714/27; 714/28; 714/29; 714/30; 714/31; 712/227

(58) Field of Classification Search ............. 714/10–12, 714/37–39, 48–56, 25–31; 717/124–132, 717/140, 141, 145, 146, 149, 150, 154, 158, 717/159–161; 712/32, 203, 220–223, 227
See application file for complete search history.

(56) References Cited

U.S. PATENT DOCUMENTS

| | | | | |
|---|---|---|---|---|
| 3,879,712 A | | 4/1975 | Edge et al. | |
| 4,833,599 A | * | 5/1989 | Colwell et al. | 712/236 |
| 4,839,895 A | | 6/1989 | Makita | |
| 4,914,572 A | | 4/1990 | Bitzinger et al. | |
| 5,202,975 A | | 4/1993 | Rasbold et al. | |
| 5,327,550 A | | 7/1994 | Pribnow | |
| 5,412,671 A | | 5/1995 | Tsuchiya | |
| 5,673,388 A | * | 9/1997 | Murthi et al. | 714/42 |
| 5,819,088 A | | 10/1998 | Reinders | |
| 5,835,776 A | | 11/1998 | Tirumalai et al. | |
| 6,134,675 A | * | 10/2000 | Raina | 714/37 |
| 6,408,377 B2 | | 6/2002 | Munson | |
| 6,434,712 B1 | | 8/2002 | Urban et al. | |
| 6,553,530 B1 | | 4/2003 | Kim | |
| 6,640,313 B1 | * | 10/2003 | Quach | 714/10 |
| 6,760,888 B2 | * | 7/2004 | Wang et al. | 716/1 |

FOREIGN PATENT DOCUMENTS

GB      2 158 977 A      11/1985

OTHER PUBLICATIONS

Patents Act 1977: Search Report under Section 17 for Application No. GB 0 420 979.7.

* cited by examiner

*Primary Examiner*—Wei Y. Zhen
*Assistant Examiner*—Junchun Wu (57) ABSTRACT

One embodiment disclosed relates to a method of compiling a program to be executed on a target microprocessor with multiple execution units of a same type. The method includes selecting one of the execution units for testing and scheduling the parallel execution of program code and diagnostics code. The diagnostic code is scheduled to be executed on the selected execution unit. The program code is scheduled to be executed on remaining execution units of the same type.

23 Claims, 9 Drawing Sheets

RUNTIME QUALITY VERIFICATION OF EXECUTION UNITS

BACKGROUND OF THE INVENTION

1. Field of the Invention

The present invention relates generally to computer systems. More particularly, the present invention relates to microprocessors and compilers.

2. Description of the Background Art

One conventional solution for providing fault tolerance in digital processing by central processing units (CPUs) involves a computer system with multiple CPUs. For example, the multiple CPUs may be operated in full lock-step to achieve a level of fault-tolerance in their computations. Such lock-stepping may be implemented using highly complex voting schemes. Substantial extra system hardware is required (for example, typically three times that needed for a non-redundant solution). Hence, the lock-step solution disadvantageously requires additional system hardware and support infrastructure.

Another conventional solution for providing fault tolerance in digital processing by central processing units (CPUs) involves the use of software verification. The software verification may be performed either by executing the program multiple times on the same computer or on different computers. Typically, the program is re-run at least three times, resulting in effective execution times that are three times greater than they are without the software verification. As such, the software-verification solution disadvantageously requires a longer run-time or requires multiple computers.

Another conventional solution is to perform system self-test or off-line diagnostics. Such testing may provide quality verification of CPU execution units. However, the computer system needs to be shut down to run these programs. This requires undesirable system downtime.

The above-discussed conventional solutions are expensive in terms of cost and/or system performance. Hence, improvements in systems and methods for providing fault tolerant digital processing by CPUs are highly desirable.

SUMMARY

One embodiment of the invention pertains to a method of compiling a program to be executed on a target microprocessor with multiple execution units of a same type. The method includes selecting one of the execution units for testing and scheduling the parallel execution of program code and diagnostics code. The diagnostic code is scheduled to be executed on the selected execution unit. The program code is scheduled to be executed on remaining execution units of the same type.

Another embodiment of the invention pertains to a computer-readable program product for execution on a target microprocessor having multiple execution units of a same type integrated thereon. The program product includes diagnostic code and program code. The diagnostic code is configured to be executed on a selected execution unit of the multiple execution units, and the program code is configured to be executed on remaining execution units of the same type.

Another embodiment of the invention pertains to a computer-readable program product comprising diagnostic code. The diagnostic code is configured to be executed on a selected execution unit of the multiple execution units and is further configured to be run in a background type process on a multi-threaded operating system. The selected execution unit rotates between the multiple execution units such that each execution unit is tested.

DETAILED DESCRIPTION

As discussed above, prior systems and methods for fault-tolerant digital processing by CPUs have various disadvantages. The present invention relates to systems and methods for improving the reliability of computations performed by a CPU.

As more and more transistors are put on integrated circuits with smaller and smaller feature sizes and lower voltage levels, the need for on-chip fault tolerance features is increased. Typically, error correction coding may be used to detect and correct errors. Unfortunately, it is difficult to fully apply error correction coding for CPU execution units such as arithmetic logic units (ALUs) and floating point units (FPUs). The industry available solution for this problem is to offer lock-stepped CPUs. Unfortunately, this is very expensive from the cost and system infrastructure perspectives. Therefore, another solution is required to provide fault tolerance for these units.

Figure 1:
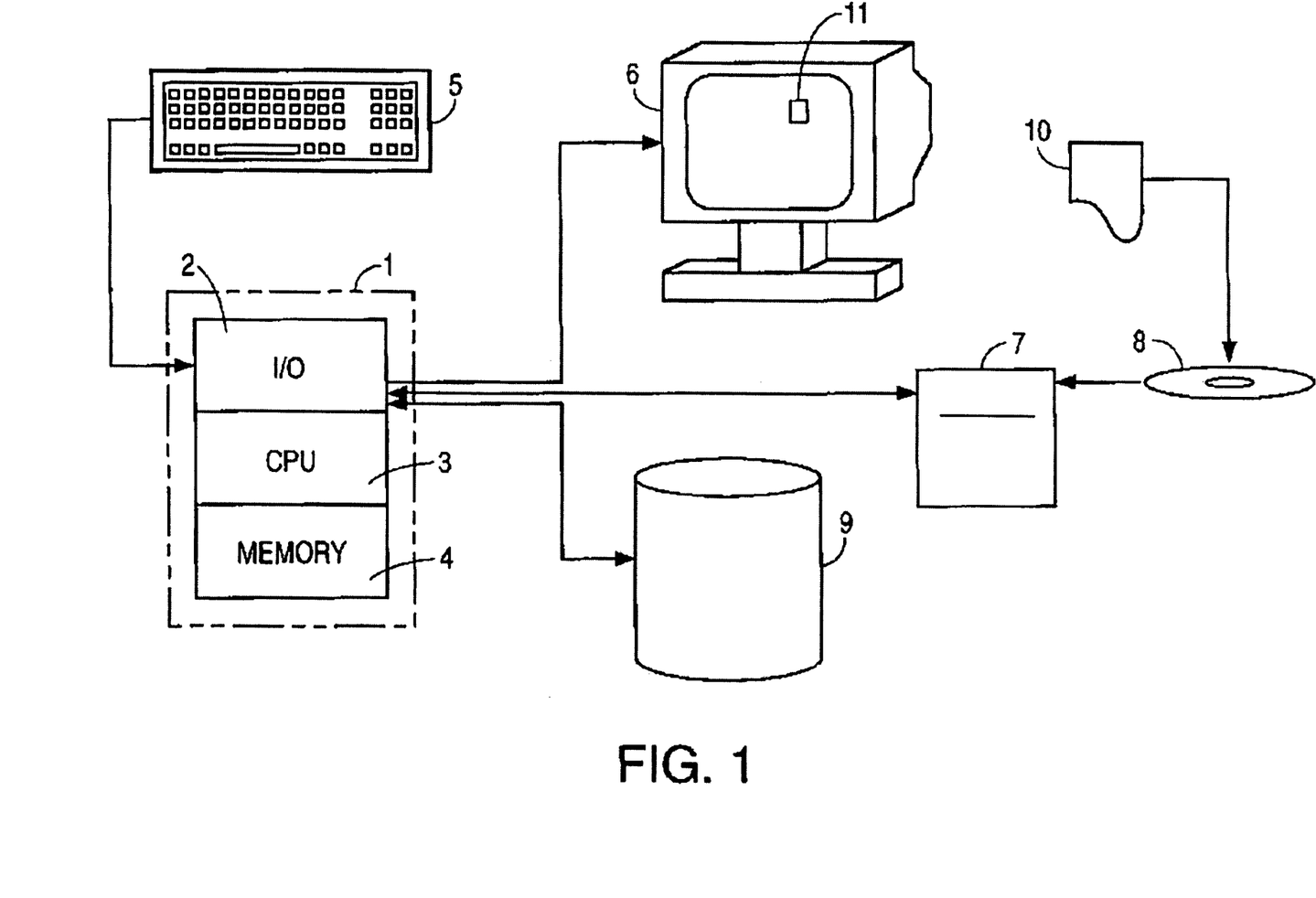
FIG. 1 illustrates a portion of a computer, including a CPU and conventional memory in which the presentation may be embodied.

The environment in which the present invention is used encompasses a general-purpose computer system, such as a server, a workstation or other computing system. Some of the elements of a general-purpose computer are shown in FIG. 1, wherein a computing system 1 is shown, having an Input/output ("I/O") section 2, a microprocessor or central processing unit ("CPU") 3, and a memory section 4. The I/O section 2 is connected to a keyboard and/or other input devices 5, a display unit and/or other output devices 6, one or more fixed storage units 9 and/or removable storage units 7. The removable storage unit 7 can read a data storage medium 8 which typically contains programs 10 and other data.

Figure 2:
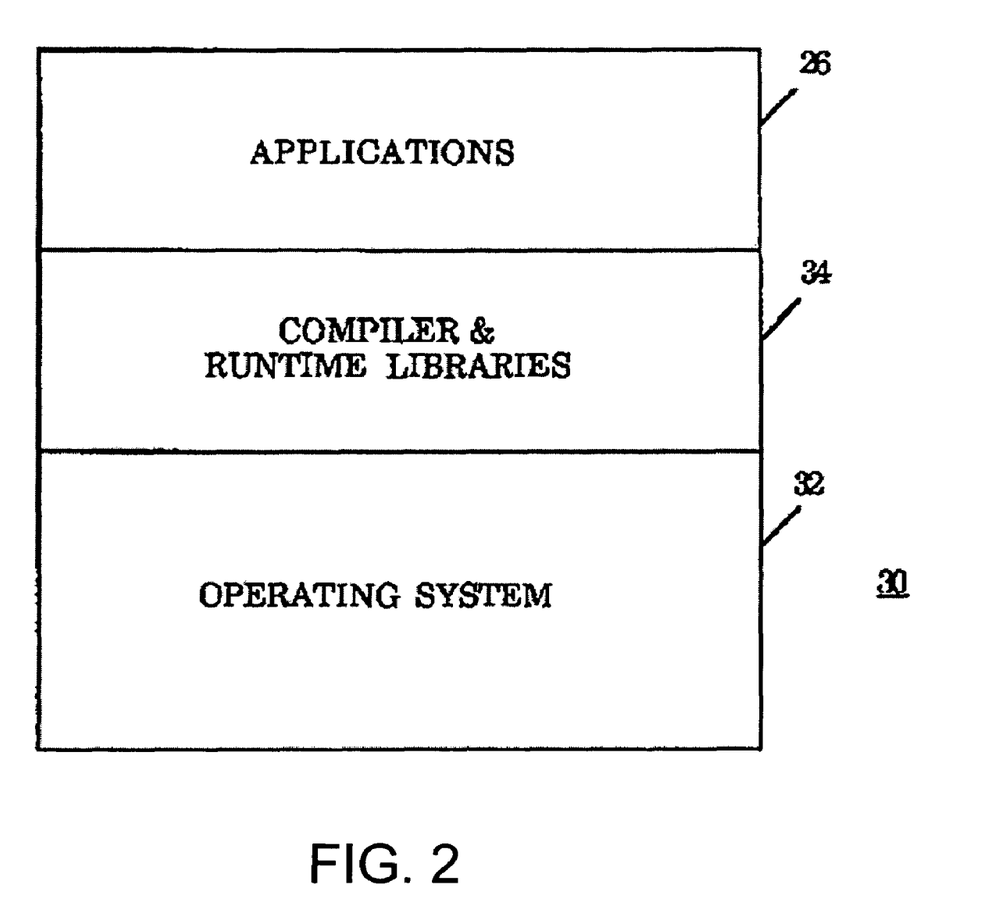
FIG. 2 illustrates example software elements of the illustrative computer system of FIG. 1.

FIG. 2 illustrates example software elements of the illustrative computer system of FIG. 1. Shown are application programs 26. Such applications 26 may be compiled using a compiler 34 incorporated with the teachings of the present invention. The compiled application programs 26 access the runtime libraries 34 for services during execution, which in turn access the operating system 32 for system services. The compiler 34 also accesses the operating system 32 for system services during compilation of application programs 26.

A compiler 34 incorporating the teachings of the present invention may comprise either a native compiler running on the target microprocessor system, or a cross compiler running on a different microprocessor system. In accordance with an embodiment of the invention, the target microprocessor for the compiler has multiple functional units of the same type. For example, the microprocessor may comprise one with a superscalar architecture.

Figure 3A:
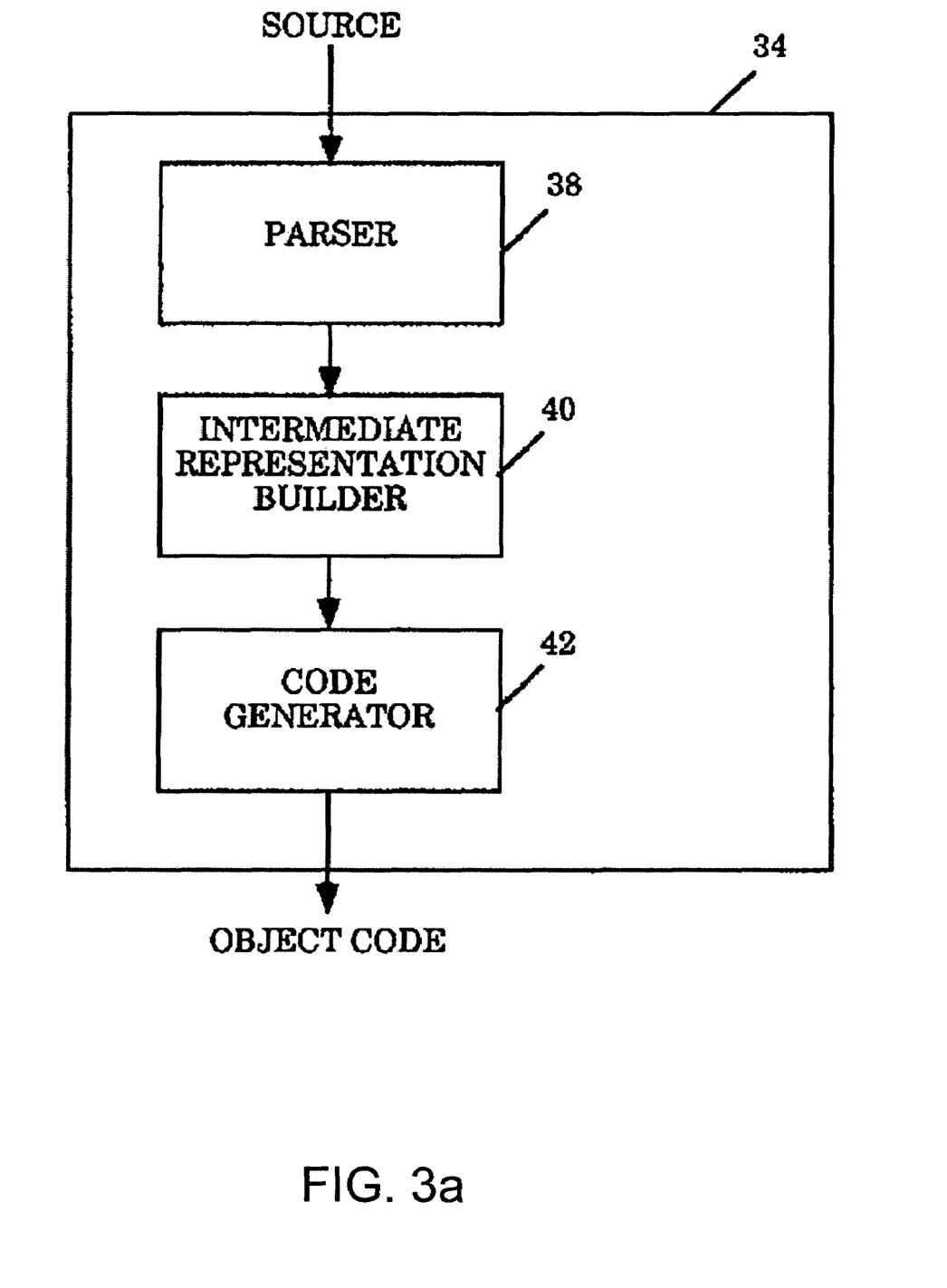
FIG. 3a is a block diagram illustrating components of a compiler in one example.
Figure 3B:
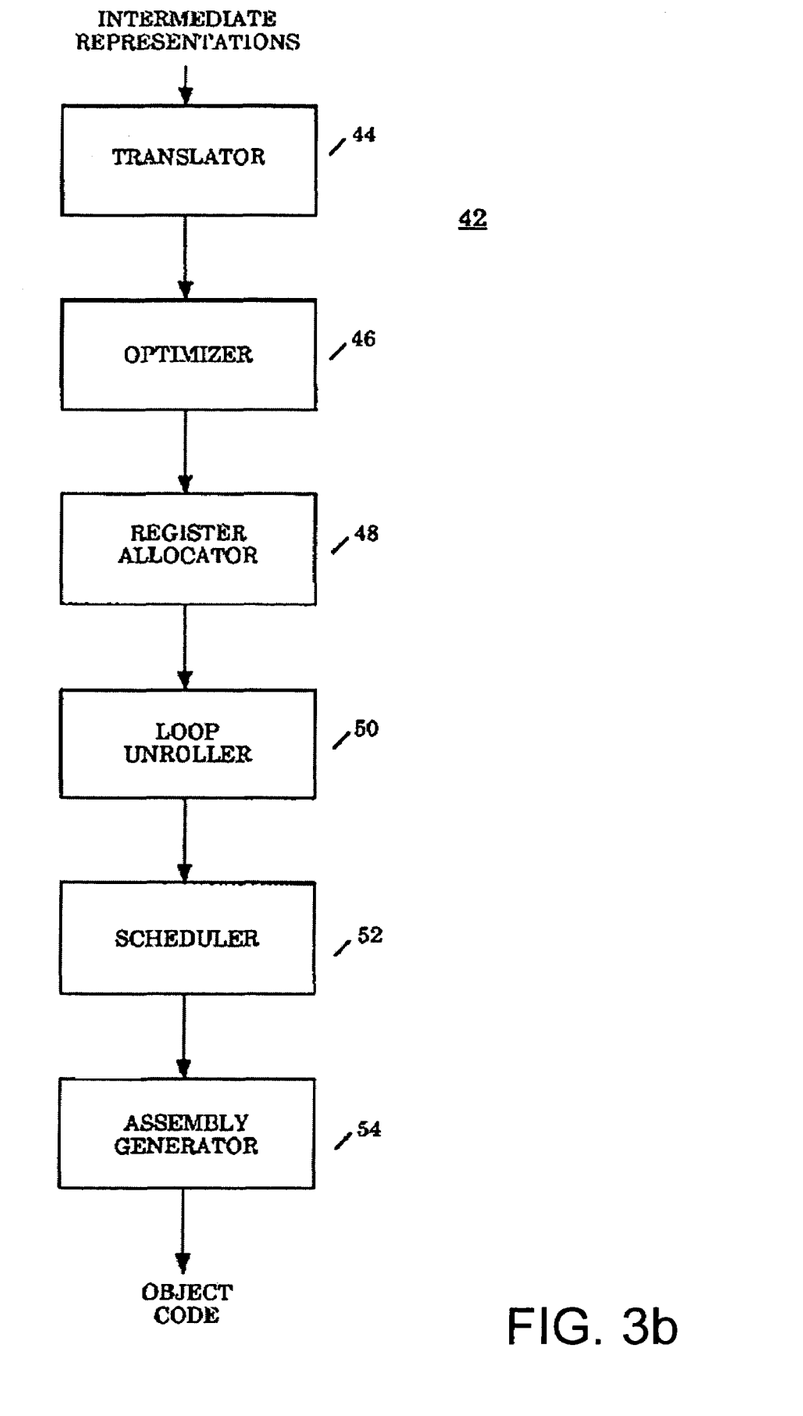
FIG. 3b is a block diagram illustrating components of a code generator in one example.

Referring now to FIGS. 3a and 3b, these block diagrams illustrate one embodiment of a compiler. As illustrated in FIG. 3a, in this embodiment, the compiler 34 comprises a parser 38, an intermediate representation builder 40, and a code generator 42 incorporated with the teachings of the present invention. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. The compiler 34 may be configured differently in accordance with other embodiments.

As illustrated in FIG. 3b, in this embodiment, the code generator 42 is configured to include a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. The register allocator 48 receives the optimized intermediate representations and associated information as inputs. In response, it allocates registers of the target microprocessor to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the target microprocessor. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled. The code generator 42 may be configured differently in accordance with other embodiments.

While for ease of understanding, the code generator 42 is being described with the above described embodiment which allocates registers before unrolling the loops in the instructions being generated and scheduling instructions for parallelism, based on the descriptions to follow, it will be appreciated that the present invention may be practiced with other register allocation, loop unrolling and scheduling approaches having different register allocation, loop unrolling and scheduling order.

Figure 4:
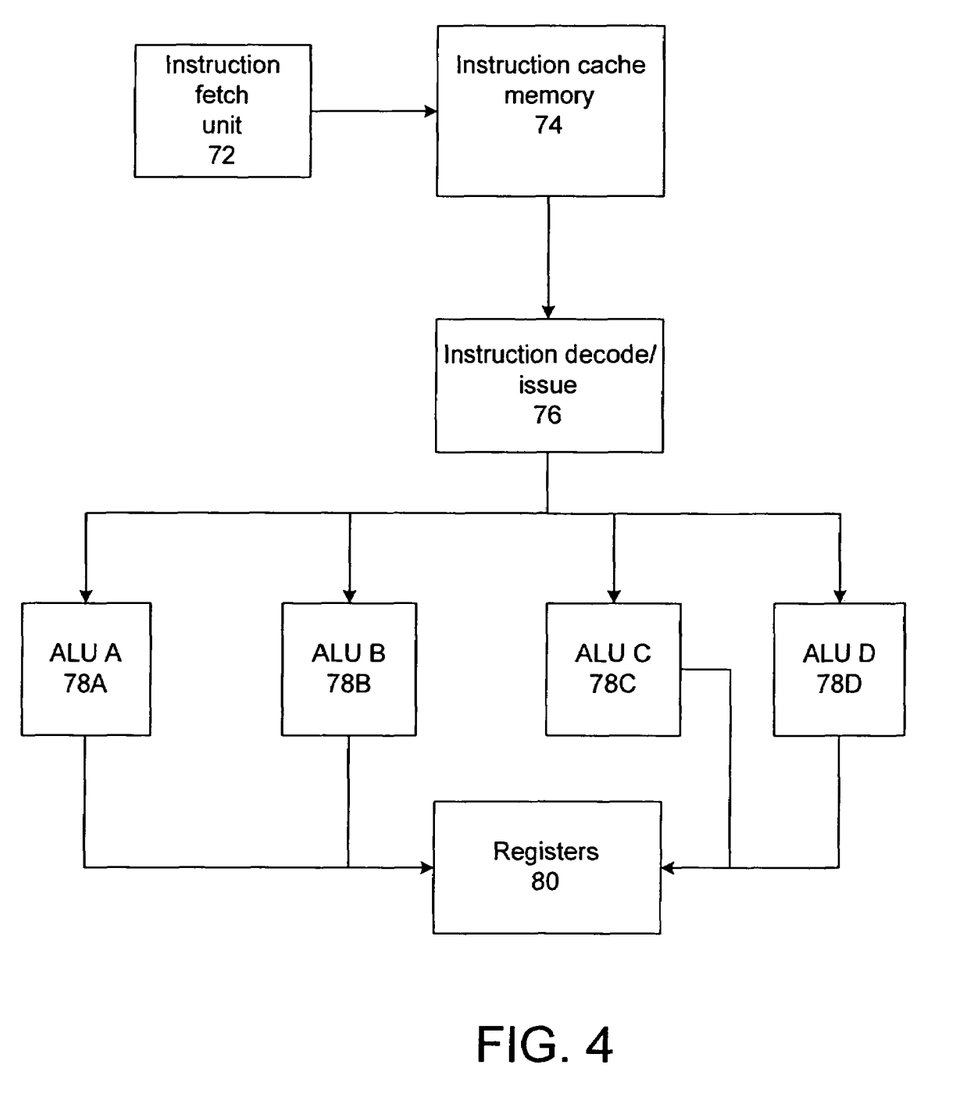
FIG. 4 is a schematic diagram depicting select components of a CPU with multiple arithmetic logic units in one example.

FIG. 4 is a schematic diagram depicting select components of a CPU with multiple arithmetic logic units in one example. An actual CPU will, of course, have numerous other components that are not illustrated.

The components illustrated for explanatory purposes include an instruction fetch unit 72, an instruction cache memory 74, instruction decode/issue circuitry 76, multiple arithmetic logic units (ALUs) 78, and registers 80. The configuration of these components in FIG. 4 is just one example configuration. While the configuration illustrated has four ALUs 78, embodiments of the invention may also be implemented on microprocessors with any number of two or more ALUs.

The instruction cache 74 stores instructions that are frequently being executed. Similarly, a data cache (not illustrated) may store data that is frequently being accessed to execute the instructions. In some implementations, the instruction and data caches may be combined into one memory. There is also typically access (not illustrated) to dynamic random access memory (DRAM), disk drives, and other forms of mass storage.

Addresses of instructions and memory may be generated by circuitry in the instruction fetch unit 72. For example, the fetch unit 72 may be configured to include a program counter that increments from a starting address within the instruction cache 74 serially through successive addresses in order to serially read out successive instructions stored at those addresses. The instruction decode/issue circuitry 76 receives instructions from the cache 74, and decodes and/or issues them to the ALUs 78 for execution. For example, four separate instructions may be decoded and issued, one to each of four ALUs 78A through 78D, for execution in a particular cycle. The ALUs 78 may be configured to output the results of the execution to specific registers 80 in the microprocessor. Other circuitry, such as that to supply operands for the instruction execution, is not illustrated.

Figure 5:
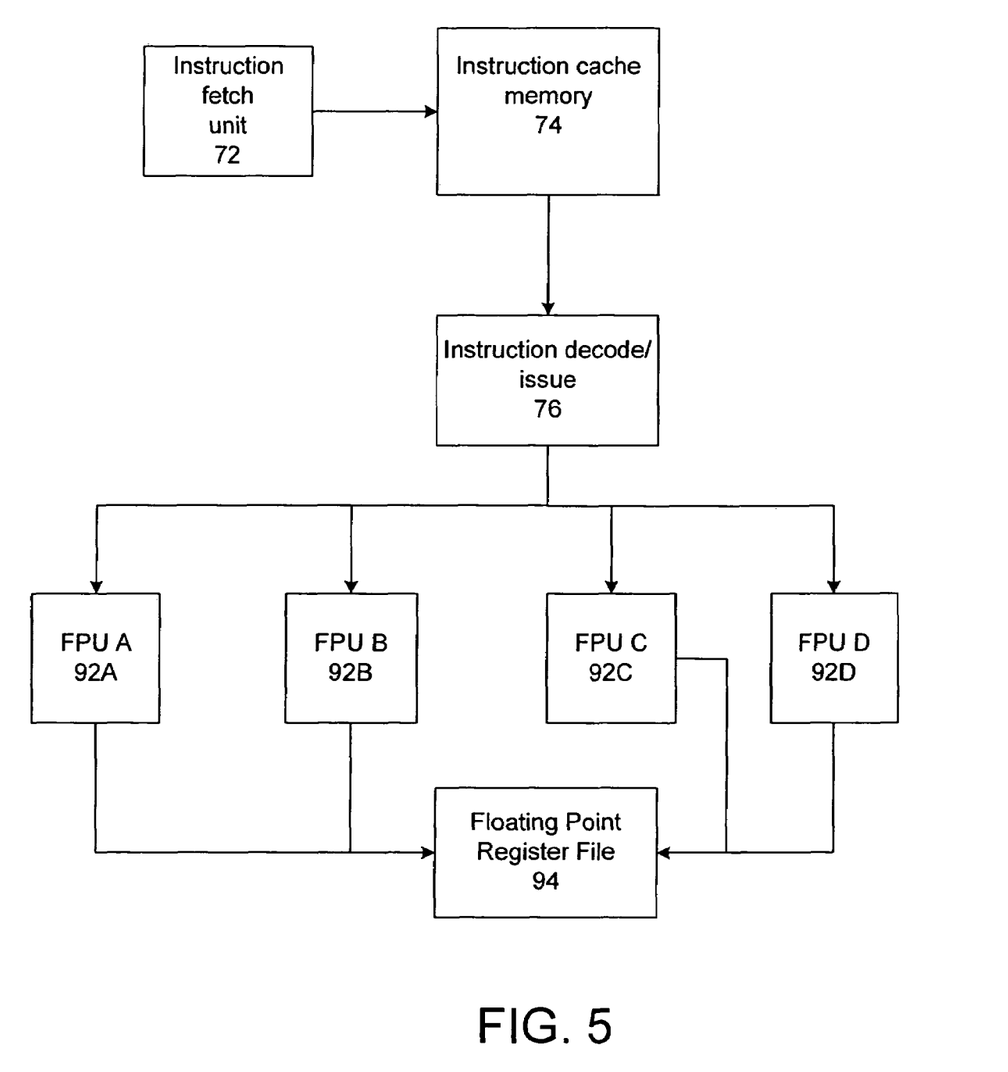
FIG. 5 is a schematic diagram depicting select components of a. CPU with multiple floating point units in one example.

FIG. 5 is a block diagram illustrating select components of a CPU with multiple floating point units in one example. An actual CPU will, of course, have numerous other components that are not illustrated.

The components illustrated for explanatory purposes include an instruction fetch unit 72, an instruction cache memory 74, instruction decode/issue circuitry 76, multiple floating point units (FPUs) 92, and a floating point register file 94. The configuration of these components in FIG. 5 is just one example configuration. While the configuration illustrated has four FPUs 78, embodiments of the invention may also be implemented on microprocessors with with any number of two or more FPUs.

The fetch unit 72, instruction cache 74, and the decode/issue unit 76 has the same or similar functionality as described above in relation to FIG. 4. In this instance, the instruction decode/issue circuitry 76 receives floating point type instructions from the cache 74, and decodes and/or issues them to the FPUs 92 for execution. For example, four separate floating point instructions may be decoded and issued, one to each of four FPUs 92A through 92D, for execution in a particular cycle. The FPUs 92 may be configured to output the results of the execution to specific floating point registers 94 in the microprocessor. Other circuitry, such as that to supply operands for the floating point operation execution, is not illustrated.

While FIGS. 4 and 5 depict multiple ALUs and FPUs, embodiments of the present invention may be utilize other types of functional or execution units as well. These functional or execution units comprise resources that may be scheduled by a compiler.

Figure 6:
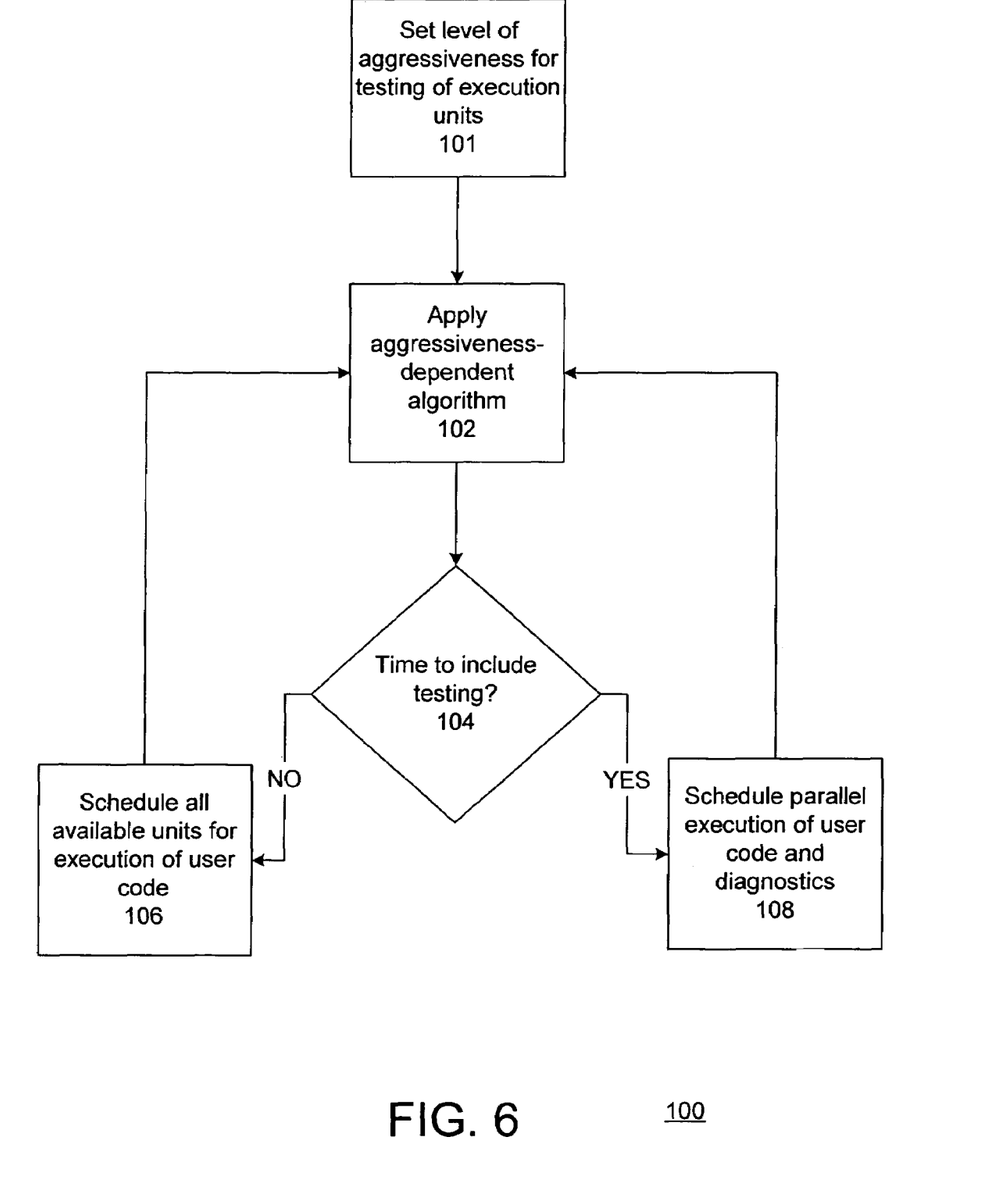
FIG. 6 is a flow chart depicting a method of scheduling runtime quality verification of execution units in accordance with an embodiment of the invention.

FIG. 6 is a flow chart depicting a method 100 of scheduling runtime quality verification of execution units in accordance with an embodiment of the invention. The method 100 of FIG. 6 may be utilized for a target microprocessor with multiple execution units of a same type. For example, the target microprocessor may have multiple ALUs and/or multiple FPUs.

Per the method 100 of FIG. 6, a preliminary step may involve setting 101 a variable level of aggressiveness for the testing of the execution units. In one embodiment, the variable level of aggressiveness may be implemented using one or more variable compiler flag(s). For example, a variable flag may specify a frequency of the testing. As another example, a variable flag may specify a maximum amount of performance overhead to be taken up by such testing. By setting the level of aggressiveness, a conscious tradeoff can be made by a user between performance and fault tolerance. The selected level of aggressiveness may depend, for example, on the application being compiled and the specific intended use of that application. For applications that require high performance, a low level of testing may be specified. For applications that require more fault tolerance and protection against downtime, a higher level of testing may be scheduled (at the cost of some performance degradation. In one embodiment, a separate level of aggressiveness may be set for each type of multiple functional units.

In one embodiment, an algorithm is used by the compiler to apply 102 the level of aggressiveness. The algorithm determines 104 when it is an appropriate time to schedule testing of an execution unit alongside the execution of the user code. The higher the level of aggressiveness, the more often testing will be included. The lower the level of aggressiveness, the less often testing will be included. In a lowest level, the testing may be turned "off".

If the algorithm determines that it is not time to include the testing, the compiler will schedule 106 all available execution units of the pertinent type to be used for the execution of the user code. If the algorithm determines that it is time to include the testing, the compiler will schedule 108 parallel execution of the user code and of diagnostic testing. Such parallel execution is discussed in further detail below. In accordance with an embodiment of the invention, the algorithm is configured to opportunistically and intelligently schedule the diagnostic routine into the user (or kernel) code so as to reduce the amount of performance overhead incurred.

Figure 7:
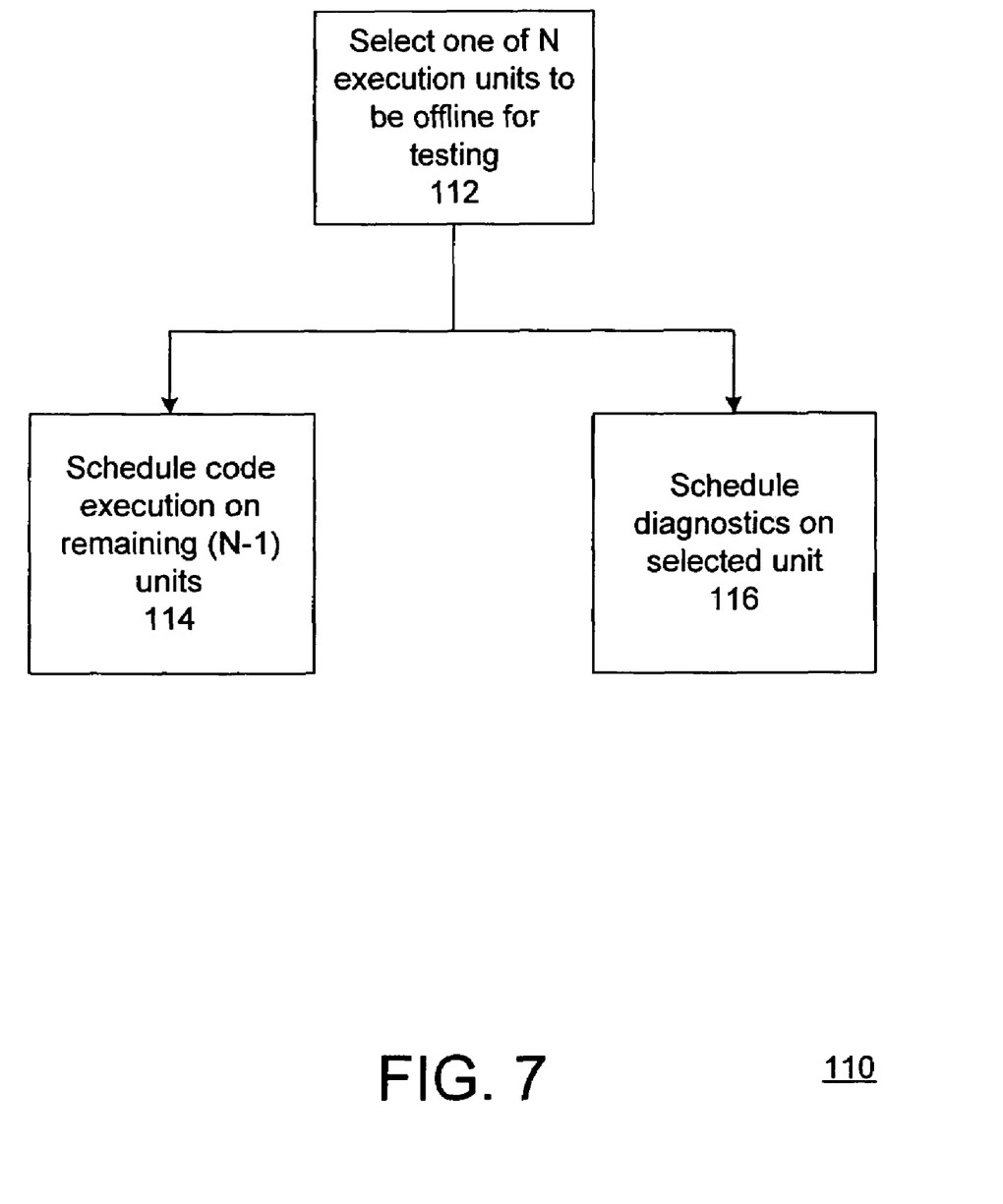
FIG. 7 is a flow chart depicting a process for scheduling the parallel execution of user code and functional unit diagnostics in accordance with an embodiment of the invention.

FIG. 7 is a flow chart depicting a process 110 for scheduling the parallel execution of user code and functional unit diagnostics in accordance with an embodiment of the invention. The process 110 of FIG. 7 may be utilized for a target microprocessor with N execution units of a same type, where N is two or more. For instance, this process 110 may be applied by a compiler to implement the parallel scheduling step 108 of FIG. 6.

Per the embodiment depicted in FIG. 7, one of the N execution units of a same type is selected 112 to be "offline" for testing purposes. In other words, the selected execution unit will be made unavailable to schedule execution of user code, but rather it will be reserved to schedule diagnostics operations thereon. In accordance with one embodiment, the selection 112 may be performed by an algorithm that assures full coverage of the N execution units. For example, the algorithm may use a round-robin type method to select 112 the unit to be tested.

Subsequently, the compiler schedules 114 user code for execution on the remaining (N-1) execution units and in parallel schedules 116 diagnostics on the selected execution unit. While in the preferred embodiment only one of the multiple execution units of a same type is scheduled for diagnostics at any particular cycle, an alternate embodiment may schedule more than one unit at a time for diagnostics. However, the alternate embodiment would typically have a higher performance overhead.

Each scheduled diagnostic operation may be selected from a predetermined test pattern. Such a test pattern should include diagnostic operations and associated known results. Preferably, the test pattern is chosen so as to provide an effective trial as to the proper functioning of various components of the functional unit being tested. The specifics of an effective test pattern depends on specifics of the execution unit being tested. In accordance with an embodiment of the invention, the testing coverage is configurable. For example, the number and type of patterns of the testing may be configured using compiler flags.

Figure 8:
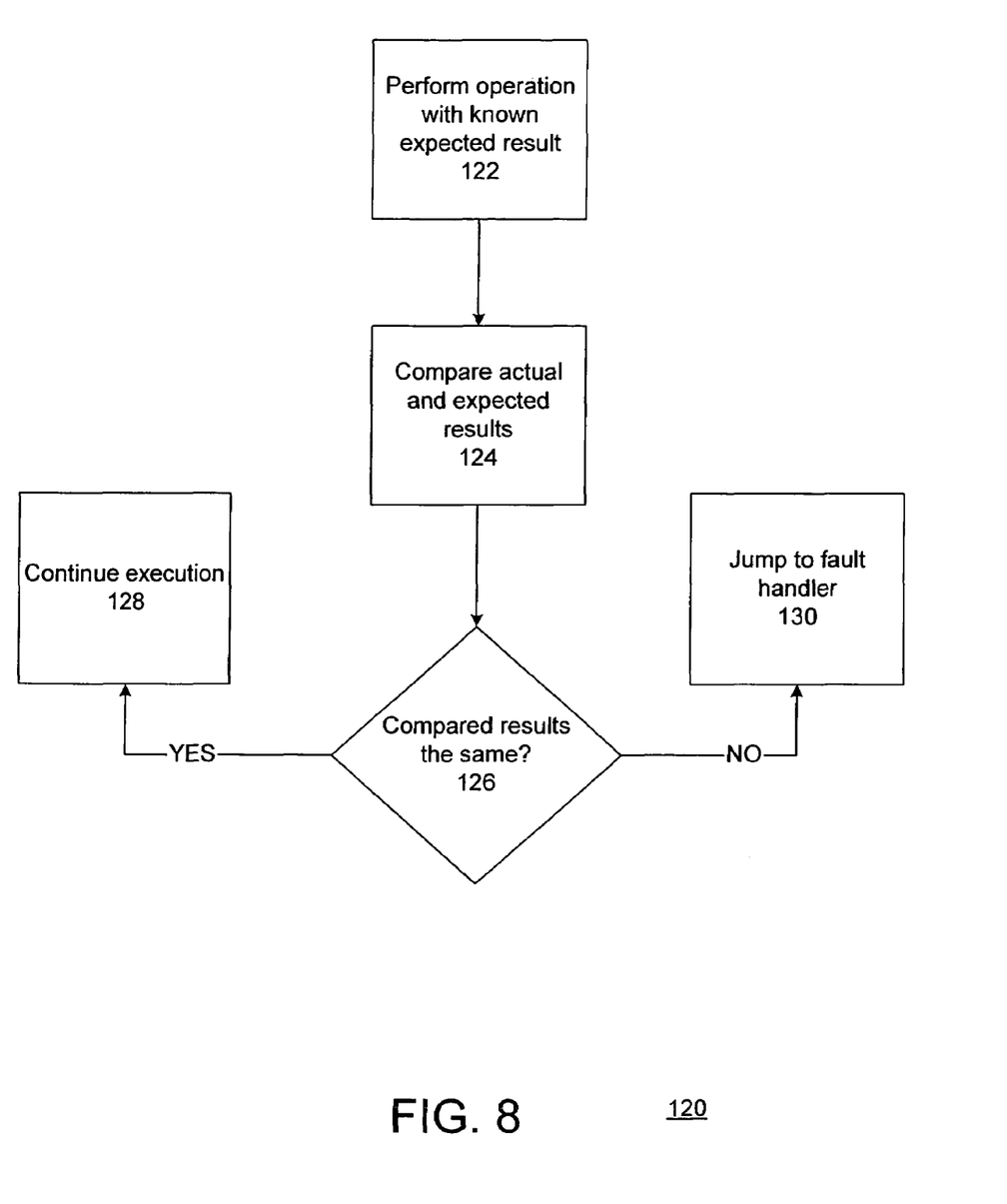
FIG. 8 is a flow chart depicting a diagnostic process to verify proper operation of an execution unit in accordance with an embodiment of the invention.

FIG. 8 is a flow chart depicting a diagnostic process 120 which may be scheduled 116 to verify proper operation of an execution unit in accordance with an embodiment of the invention. Note that the process 120 depicted in FIG. 8 is an example process for explanatory purposes.

The scheduled diagnostic operation is performed 122 on the execution unit. It is performed with predetermined knowledge as to the expected result. The actual and expected results are then compared 124 and a determination 126 is made as to whether the compared results are the same. If the results are the same, then no error is indicated, and the execution of instruction continues 128. If the results are not the same, then a fault in the execution unit is indicated, and a jump 130 to a fault handler may occur. The fault handler may be configured to take appropriate action.

In accordance with one embodiment, the functional unit failing the diagnostic test may be "black-listed" and removed from use in executing code. In other words, the execution unit may be marked as no-use (not to be used). Such no-use functionality may be implemented by way of specific hardware circuitry. Marking one unit as no-use reduces the number of usable units by one to N-1. Subsequently, diagnostics may be continued to be performed on the execution units. In that case, only N-2 units would be online while one unit would be reserved for diagnostic testing. And so on.

In accordance with another embodiment, the failure of one of the functional units may result in a halt of the system. Such a system halt, may be utilized before user data can be affected so as to prevent potential data corruption.

One specific embodiment of the invention involves creation of a program that runs in the background on a multi-threaded operating system. The program may, for example, do "nothing" other than diagnostics, and be compiled with the compiler flags turned "on" and up to a maximum aggressiveness level. Such a program may provide a good level of fault checking with limited system overhead.

Because it is normally cost prohibitive to do full burn-in (past the left side of the well known "bathtub curve") on every CPU chip, a certain latent defect rate for CPU chips is usually considered as "acceptable". Advantageously, an embodiment of the invention exploits the fact that latent defects or weak latches in execution units tend to be predictable in advance in that they tend to "weaken" over time. In accordance with an embodiment of the invention, such defects may be found at run time and before they cause data corruption or cause a machine check and system failure.

In addition, an embodiment of the invention achieves a level of fault tolerance for a CPU without requiring extra hardware circuitry be designed into the CPU. Instead, the fault tolerance may be provided by software modification to the compiler so as to "borrow" one functional unit at a time to test the proper operation thereof while the remaining functional units of the same type continue to execute the user code. Furthermore, the use of known data patterns may advantageously reduce the performance overhead because the calculated result is compared to a known result that may be pre-calculated at compile time.

An embodiment of the present invention advantageously makes fault tolerant features available on lower-end systems.

Previously, such fault tolerant features may have been unavailable on such lower-end systems due to their cost-sensitive nature.

A compiler providing fault checking in accordance with an embodiment of the invention is not limited to a particular CPU architecture. A compiler for any appropriate CPU may be so modified, provided that the CPU has multiple functional units of the same type that may be scheduled in accordance with an embodiment of the invention. Furthermore, while the above discussion describes the invention in the context of compiling user code, the invention may also be applied to the compilation of non-user code, such as, for example, kernel code for an operating system.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of compiling a program to be executed on a target microprocessor with multiple execution units of a same type, the method comprising:
    selecting, by a program compiler, one of the execution units for testing;
    scheduling, by the program compiler, execution of diagnostic code on the selected execution unit; and scheduling, by the program compiler, execution of program code on remaining execution units of the same type;
    setting a level of aggressiveness for scheduling the testing of the execution units; and applying an aggressiveness-dependent algorithm to determine when to schedule all available units for execution of the program code and when to schedule parallel execution of the program code and the diagnostic code,
    wherein said execution of diagnostic code on the selected execution unit and said execution of program code on the remaining execution units are scheduled to be performed in parallel.

2. The method of claim 1, wherein the selection of the execution unit for testing utilizes an algorithm that assures testing of each of the multiple execution units.

3. The method of claim 1, wherein source code is input into the program compiler, object code is output from the program compiler, and wherein said scheduling is performed by the program compiler prior to execution of the object code by the target microprocessor.

4. The method of claim 1, wherein a lowest level of aggressiveness comprises turning off said testing.

5. The method of claim 1, wherein the multiple execution units of the same type comprise arithmetic logic units.

6. The method of claim 1, wherein the multiple execution units of the same type comprise floating point units.

7. The method of claim 1, wherein the multiple execution units comprise at least four execution units of the same type integrated onto the microprocessor integrated circuit.

8. The method of claim 1, wherein the scheduled diagnostic code performs diagnostic operations from a test pattern comprising operations with known expected results.

9. The method of claim 8, wherein the scheduled diagnostic code compares an actual result with a known expected result.

10. The method of claim 9, wherein the scheduled diagnostic code jumps to a fault handler if the compared results are different.

11. The method of claim 10, wherein the fault handler includes code to remove a faulty execution unit from use in executing code.

12. The method of claim 10, wherein the fault handler includes code to perform a system halt to prevent data corruption.

13. A computer-readable medium having a program product for execution on a target microprocessor having multiple execution units of a same type integrated thereon, the program product comprising:
    microprocessor-executable diagnostic code stored on the computer-readable medium and configured by a program compiler to be executed on a selected execution unit of the multiple execution units;
    microprocessor-executable program code stored on the computer-readable medium and configured by the program compiler to be executed on remaining execution units of the same type;
    setting a level of aggressiveness for scheduling the testing of the execution units; and applying an aggressiveness-dependent algorithm to determine when to schedule all available units for execution of the program code and when to schedule parallel execution of the program code and the diagnostic code,
    wherein said diagnostic code and said program code are scheduled to be performed in parallel on the selected execution unit and the remaining execution units, respectively.

14. The computer-readable medium of claim 13, wherein the selected execution unit rotates between the multiple execution units such that each execution unit is tested.

15. The computer-readable medium of claim 13, wherein the multiple execution units of the same type comprise arithmetic logic units.

16. The computer-readable medium of claim 13, wherein the multiple execution units of the same type comprise floating point units.

17. The computer-readable medium of claim 13, wherein the multiple execution units comprise at least four execution units of the same type integrated onto the microprocessor integrated circuit.

18. The computer-readable medium of claim 13, wherein the scheduled diagnostic code performs diagnostic operations from a test pattern comprising operations with known expected results.

19. The computer-readable medium of claim 18, wherein the diagnostic code compares an actual result with a known expected result.

20. The computer-readable medium of claim 19, wherein the diagnostic code jumps to a fault handler if the compared results are different.

21. The computer-readable medium of claim 20, wherein the fault handler includes code to remove a faulty execution unit from use in executing code.

22. The computer-readable medium of claim 20, wherein the fault handler includes code to perform a system halt to prevent data corruption.

23. A computer-readable medium having a program product for execution on a target microprocessor having multiple execution units of a same type integrated thereon, the program product comprising:

microprocessor-executable diagnostic code stored on the computer-readable medium and scheduled by a program compiler to be executed on a selected execution unit of the multiple execution units;

microprocessor-executable program code stored on the computer-readable medium and scheduled by the program compiler to be executed on remaining execution units at a same time as the diagnostic code is to be executed on the selected execution unit;

setting a level of aggressiveness for scheduling the testing of the execution units; and applying an aggressiveness-dependent algorithm to determine when to schedule all available units for execution of the program code and when to schedule parallel execution of the program code and the diagnostic code, wherein the selected execution unit rotates between the multiple execution units such that each execution unit is tested, and wherein said diagnostic code is further configured to be run in a background type process on a multi-threaded operating system.

* * * * *

UNITED STATES PATENT AND TRADEMARK OFFICE
CERTIFICATE OF CORRECTION

| | |
|---|---|
| PATENT NO. | : 7,415,700 B2 |
| APPLICATION NO. | : 10/684842 |
| DATED | : August 19, 2008 |
| INVENTOR(S) | : Ken Gary Pomaranski et al. |

It is certified that error appears in the above-identified patent and that said Letters Patent is hereby corrected as shown below:

On the title page, item (56), under "U.S Patent Documents", in column 2, line 15, delete "Wang et al." and insert -- Killian et al. --, therefor.

Signed and Sealed this

Fourth Day of November, 2008

JON W. DUDAS
*Director of the United States Patent and Trademark Office*